(12) United States Patent
Ye et al.

(10) Patent No.: US 7,808,219 B2
(45) Date of Patent: Oct. 5, 2010

(54) METHOD AND APPARATUS OF CAPACITOR DIVIDER BASED OFFLINE AC-DC CONVERTER

(75) Inventors: Yang Ye, Mississauga (CA); Wenjiang Yu, Mississauga (CA); Yuanli Kathy Kang, Mississauga (CA); Zhenning Z. Liu, Mississauga (CA); Randy J. Fuller, Hillsburgh (CA)

(73) Assignee: Honeywell International Inc., Morristown, NJ (US)

( * ) Notice: Subject to any disclaimer, the term of this patent is extended or adjusted under 35 U.S.C. 154(b) by 371 days.

(21) Appl. No.: 11/945,035

(22) Filed: Nov. 26, 2007

(65) Prior Publication Data

US 2009/0135628 A1 May 28, 2009

(51) Int. Cl.
*G05F 1/613* (2006.01)
*H02M 7/00* (2006.01)
(52) U.S. Cl. .................. 323/224; 363/125
(58) Field of Classification Search .......... 363/16, 363/20, 21.04, 84, 89, 95, 97, 125–127, 131; 323/222–225, 282, 285
See application file for complete search history.

(56) References Cited

U.S. PATENT DOCUMENTS

| 4,437,134 A | * | 3/1984 | Dupraz .................. 361/56 |
| 4,665,355 A |   | 5/1987 | McCollum et al. |
| 4,910,654 A |   | 3/1990 | Forge |
| 5,282,126 A |   | 1/1994 | Hüsgen |
| 6,067,243 A | * | 5/2000 | Suzuki et al. ............ 363/132 |
| 6,356,059 B1 | * | 3/2002 | Yu ....................... 323/223 |
| 6,650,526 B2 | * | 11/2003 | Preller ................... 361/149 |
| 2009/0179585 A1 | * | 7/2009 | Yang ..................... 315/291 |

* cited by examiner

*Primary Examiner*—Matthew V Nguyen
(74) *Attorney, Agent, or Firm*—Oral Caglar, Esq.

(57) ABSTRACT

An AC/DC power converter has, as its first stage, a capacitor divider and rectifier and, as the second stage, a switch mode power supply. This configuration may be suitable for low power low voltage aerospace applications. The benefits of the circuit may include small reactive component size; near sinusoidal input current; low EMI emissions resulting from low inrush current; intrinsic current limiting that may eliminate the need for short circuit protection; and low overall component count.

17 Claims, 7 Drawing Sheets

METHOD AND APPARATUS OF CAPACITOR DIVIDER BASED OFFLINE AC-DC CONVERTER

BACKGROUND OF THE INVENTION

The present invention generally relates to the field of power supplies and more particularly to the field of power supplies that convert alternating current to low power, low voltage direct current.

In a typical AC power system in an aircraft, there are many low power low voltage control circuits that require a DC voltage directly from the AC lines. The AC line voltage generally provided by aircraft power systems usually has a frequency of 400 Hz at 115V. For variable frequency systems, the frequency is usually in the range of from 360 Hz to 800 Hz. In many cases, the power required for such low power low voltage control circuits is very small. However, in conventional AC/DC power supply design, the input capacitor required to interface the control circuit with the aircraft power supply system is a high voltage, high capacitance part, which tends to be bulky when compared to the size of other control circuit components. This dramatically increases the physical size of the AC/DC power supply.

Figure 1:
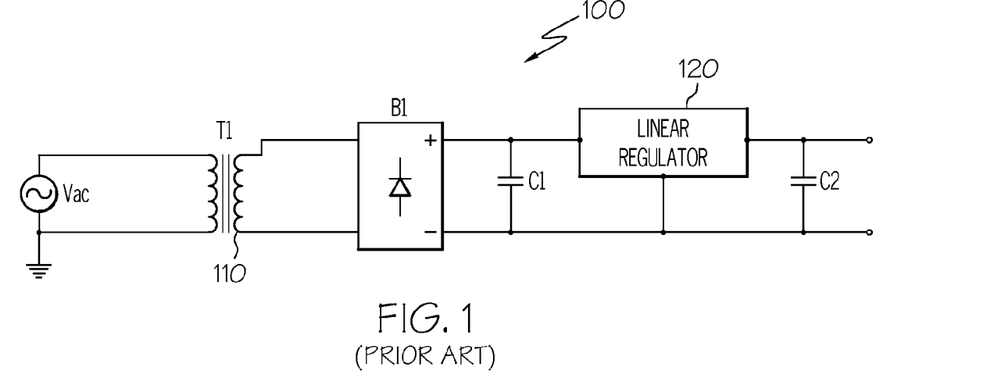
FIG. 1 is a schematic drawing of a line transformer coupled linear regulator, according to the prior art.

This problem has been dealt with in several different ways. The most common approach before introduction of the switch mode power supply has been the circuit 100 shown in FIG. 1. Here, a simplified schematic of a line transformer 110 coupled AC/DC linear regulator 120 is shown. Generally, line transformers 110 are bulky and heavy since they are constructed with iron cores. Because of these disadvantages, this configuration has been replaced by the switch mode power supply design in many applications.

Figure 2:
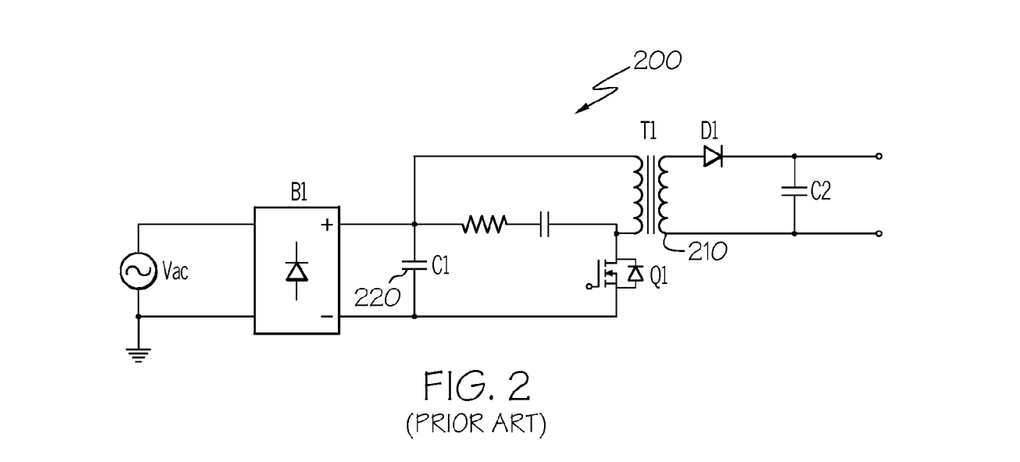
FIG. 2 is a schematic drawing of an offline flyback converter, according to the prior art.

For low power applications, this circuit has been replaced by a flyback converter design. FIG. 2 shows the simplified schematic of circuit 200 having off-line flyback converter, which may be found commercially either as discrete components or as an integrated circuit. Since this circuit operates at a high frequency (usually in the order of hundreds of kilohertz), a transformer 210 may be much smaller than the line transformer coupled AC/DC linear regulator 120 shown in FIG. 1. However, the circuit 200 still suffers from at least two problems. First, an input capacitor 220 of the circuit 200 is bulky and keeps the physical size of the circuit large. Second, the input current is pulsed, which causes undesirable electromagnetic interference (EMI) emissions which interfere with other circuits that may be in close proximity. Suppression of EMI emissions is frequently required, but this complicates the circuitry and thus increases circuit size and part count.

Other designs have been promoted, which address different aspects of the problem. The disclosure of U.S. Pat. No. 4,665,355, issued to McCollum et al. describes an off-line capacitor divider power supply, which supplies regulated DC voltage levels referenced to the AC voltage source output terminal to a load such as the control and drive circuits of a solid state power controller. The power supply design is that of a linear power supply which is good only for a fixed frequency, fixed input voltage and a fixed load. When either the input voltage or the frequency changes, the design will suffer from poor efficiency, overheat, and loss of regulation.

The disclosure of U.S. Pat. No. 4,910,654, issued to Forge, describes an AC to DC conversion circuit, in which the first stage comprises a diode bridge rectifier coupled to a capacitor divider that in turn serves as input to a switch mode power supply. The disclosed circuit addresses the problem of burning out the current limiting resistor connected to the input terminal of the AC to DC converter stage of the switch mode power supply by removing the resistor and substituting a non-dissipative capacitive divider circuit which charges the filter or storage capacitors while the input relay is open. It does not address the problem of large value capacitors in the circuit.

The disclosure of U.S. Pat. No. 5,282,126, issued to Husgen, describes a starter circuit for a switched mode power supply, in which a capacitor divider is used to receive the pulsing DC voltage provided by a bridge rectifier. The use of the capacitor divider serves as both a smoothing device for the pulsing DC voltage and eliminates the need for transistor and collector resistance rated for high voltages and large currents. However, it does not address the problems of complexity, high part counts, and large value capacitors.

Hence, it can be seen that there is a need for a power supply for aircraft electrical systems in which the conversion circuit that is small in size. Associated with the space requirement, it is desirable to have as low a component count as possible to reduce inventory requirements for spare parts and to have high reliability to reduce the probability of failure at critical times. Furthermore, close proximity of the aircraft components with each other may promote interference between systems, so that low EMI emissions may also be desirable.

SUMMARY OF THE INVENTION

In one aspect of the present invention, an AC/DC power converter is provided, where it is coupled to an AC voltage source having a ground terminal and a power terminal, for supplying regulated DC voltage levels to a load. The AC/DC power converter may be comprised of the following components: a first stage with a capacitor divider, the capacitor divider further comprised of a plurality of capacitors connected in series between the AC voltage source ground terminal and the AC voltage source power terminal, a selected capacitor from the plurality of capacitors with a capacitor power terminal and a capacitor ground terminal, such that the capacitor terminals provide a voltage across the selected capacitor; a rectifier receiving the voltage across the capacitor power terminal and the capacitor ground terminal and providing a unregulated DC voltage across a rectifier output terminal and a rectifier ground terminal; and a second stage switch mode power converter having an output power terminal and an output ground terminal, the second stage receiving the unregulated DC voltage from the rectifier and providing a regulated DC voltage across the output power terminal and the output ground terminal.

In another aspect of the invention, if isolation is not required, the second stage switch mode power converter may take the form of a buck converter, having an output power terminal and an output ground terminal. The buck converter receives the unregulated DC voltage from the rectifier and provides a regulated DC voltage across the output power terminal and the output ground terminal.

In another aspect of the invention, if isolation is required, the second stage switch mode power converter may take the form of a forward converter, where the forward converter receives the unregulated DC voltage from the rectifier and provides an isolated regulated DC voltage across the output power terminal and the output ground terminal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention may provide a novel capacitor divider based offline AC/DC converter with a second stage switch mode power converter, in which a capacitor divider may be used as the input stage to step down the voltage from an external power source. This may be followed by a rectifier and a second stage that may include a switch mode power supply. The invention may find application in the area of aircraft electrical systems for supplying low power, low voltage control circuits. The invention may also find applications in areas in which compact circuits may be required due to limitations of size and weight.

The capacitor divider used in the invention may be composed of low capacitance parts that reduce the requirement for a high value capacitor having a comparatively large size when compared to other circuit components. The invention may provide additional benefits of intrinsic current limiting, intrinsic voltage limiting, and very little input current spikes. These intrinsic benefits may also promote relatively simple control requirements for the switch mode power supply in the second stage of the power converter. Conventional current mode control may not be required. Simple hysteresis control may be applied without additional protection of the circuit from over voltage or over current conditions. This may tend to reduce parts count without compromising the reliability of the circuit.

The first stage of the inventive electrical circuit may be a capacitor divider that does not require the bulky capacitor used in a conventional switch mode AC/DC converter. This may be followed by a rectifier of standard design well known in the prior art, followed by a second stage that may be a simplified switch mode power supply. The second stage may eliminate the line frequency transformer used in conventional linear power supplies. As a result, the power converter provided by the invention may achieve smaller size and less parts count compared to other power converters found in the prior art. Furthermore, the invention may accommodate voltage sources having variable frequency and variable voltage. Frequency ranges typically encountered by the invention in aircraft power systems may be from about 360 Hz to about 800 Hz. Voltage ranges may be from about 90 v. to about 180 v. Thus, the invention can be advantageously employed in situations in which either the frequency, the voltage, or both may vary, to provide a stable DC voltage to a load.

Figure 3:
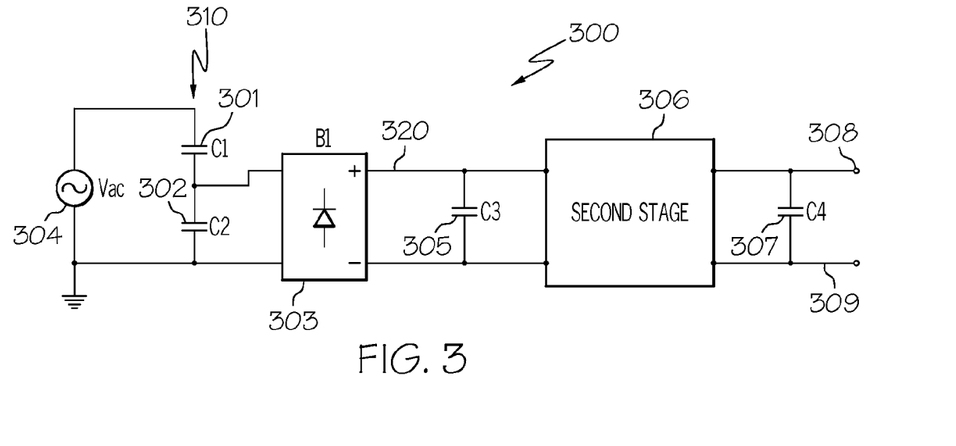
FIG. 3 is a conceptual schematic drawing of capacitor divider based offline AC/DC converter followed by a general second stage switch mode power converter, according to an embodiment of the invention.

Turning now to the description of the novel circuit and with reference first to FIG. 3, a generic circuit 300 is shown for an inventive offline AC/DC power converter, in which a capacitor divider 310 may be used as the input stage to step down the voltage from an external AC voltage source 304. Capacitors 301 and 302 may form a voltage divider that may be directly coupled to the AC input voltage source 304 without other intervening components. A portion of the input voltage may be provided across capacitor 302, which may then be sent directly to a rectifier 303 by connecting the power side of capacitor 302 to the rectifier power input terminal and the ground side of capacitor 302 to the rectifier ground terminal. The output of the rectifier 303 may be provided across capacitor 305, in order to rectify the low AC voltage from capacitor 302 into an unregulated DC voltage. The unregulated DC voltage across capacitor 305 may be provided to a second stage 306, which may further smooth and regulate to DC voltage to provide a regulated DC voltage across capacitor 307 suitable for low power circuits.

Note that capacitor 301 may be the only a high voltage component. Since capacitor 301 is in series with the remainder of the circuit 300, then any short circuit in the remainder of the circuit will not result in a high current being drawn from the voltage source 304. The capacity of capacitor 301 may be selected so that under all conditions capacitor 301 may provide the current required by the low power, low voltage control circuit connected as the load across the output power terminal 308 and output ground terminal 309 of the circuit 300. For a low power avionics application, the physical size of capacitor 301 may be fairly small, such as by way of example and not of limitation, an SMT 1206 capacitor manufactured by Panasonic, which is constructed as a stacked dielectric film capacitor with internal electrodes, having a maximum capacity of 1 µF and a physical size in millimeters measuring 3.2×1.6×1.4. Capacitor 302 may establish the maximum voltage limit for the low voltage side circuit. The presence of capacitor 302 may ensure that no over-voltage occurs in the DC output terminals 308.

Rectifier 303 may be of any typical construction generally found in the art, without departing from the scope of the invention. Rectifier 303 may rectify the low AC voltage dropped across capacitor 302. Capacitor 305 may function as a smoothing capacitor that makes the unregulated DC voltage ready for the second stage 306 circuit to process. The choice of configuration for the second stage 306 may depend upon the particular application and may be chosen without departing from the scope of the invention.

Figure 4:
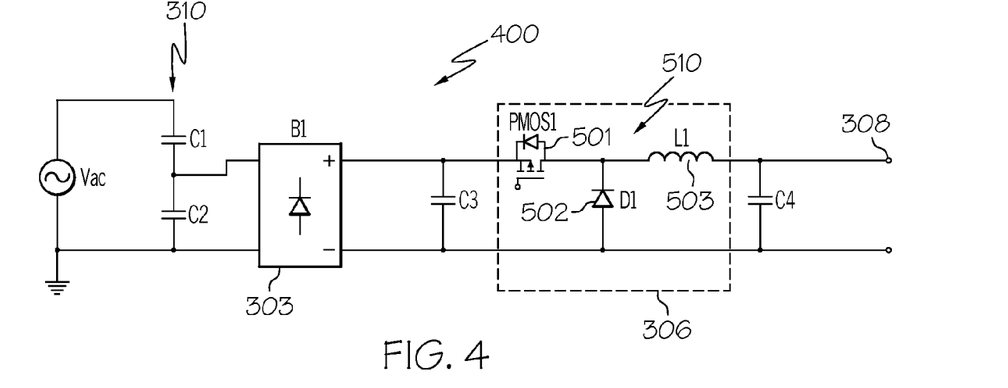
FIG. 4 is a schematic drawing of the power circuit of a capacitor divider based offline AC/DC converter having as the second stage a buck converter, according to an embodiment of the invention.

Referring now to FIG. 4, a circuit 400 may be shown which is illustrative of one of the various forms of switch mode converters that may be used as the second stage 306. For discussion purposes, only the power portion of the circuit is shown. Here, a simple buck converter 510 may be used as the second stage to provide regulated DC voltage to the output terminals. The buck converter 510 may be composed of a transistor 501, a diode 502, and a coil 503. The terminals of the transistor 501 may be connected between the output of the rectifier 303 and a coil 503. The coil 503 may be connected between the transistor 501 and the output terminal for the circuit 400. The diode 502 may have its anode connected between the output of the transistor 501 and its cathode connected to ground. If no isolation is required, then the buck converter 510 may be used to regulate the output voltage at terminals 308. For this particular embodiment, a P channel type of metal oxide silicon field effect transistor (MOSFET) having a source, a drain, and a gate may desirable since it may be easier to drive than other types of transistors. Here, the source of the P channel MOSFET may be connected to the rectifier output terminal 320, the drain may be connected to the coil 503. The control of the buck converter may be simplified in this fashion since there is no concern about over-current or short circuit protection. The circuit 500 shown in FIG. 5 may be illustrative of a buck converter having a simple hysteresis control, which can be used when over-current is not a concern. Here, the gate of the MOSFET 501 may be controlled by a hysteresis loop 610 that may monitor the voltage across the output terminals 308.

Figure 5:
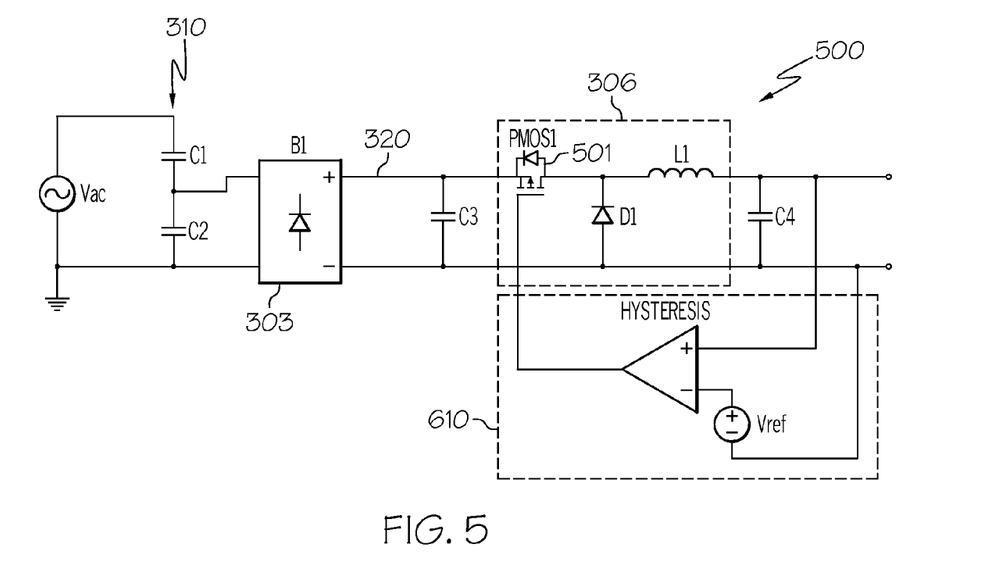
FIG. 5 is a schematic drawing of the capacitor divider based offline AC/DC converter in FIG. 4, with a conceptual hysteresis control, according to an embodiment of the invention.
Figure 6:
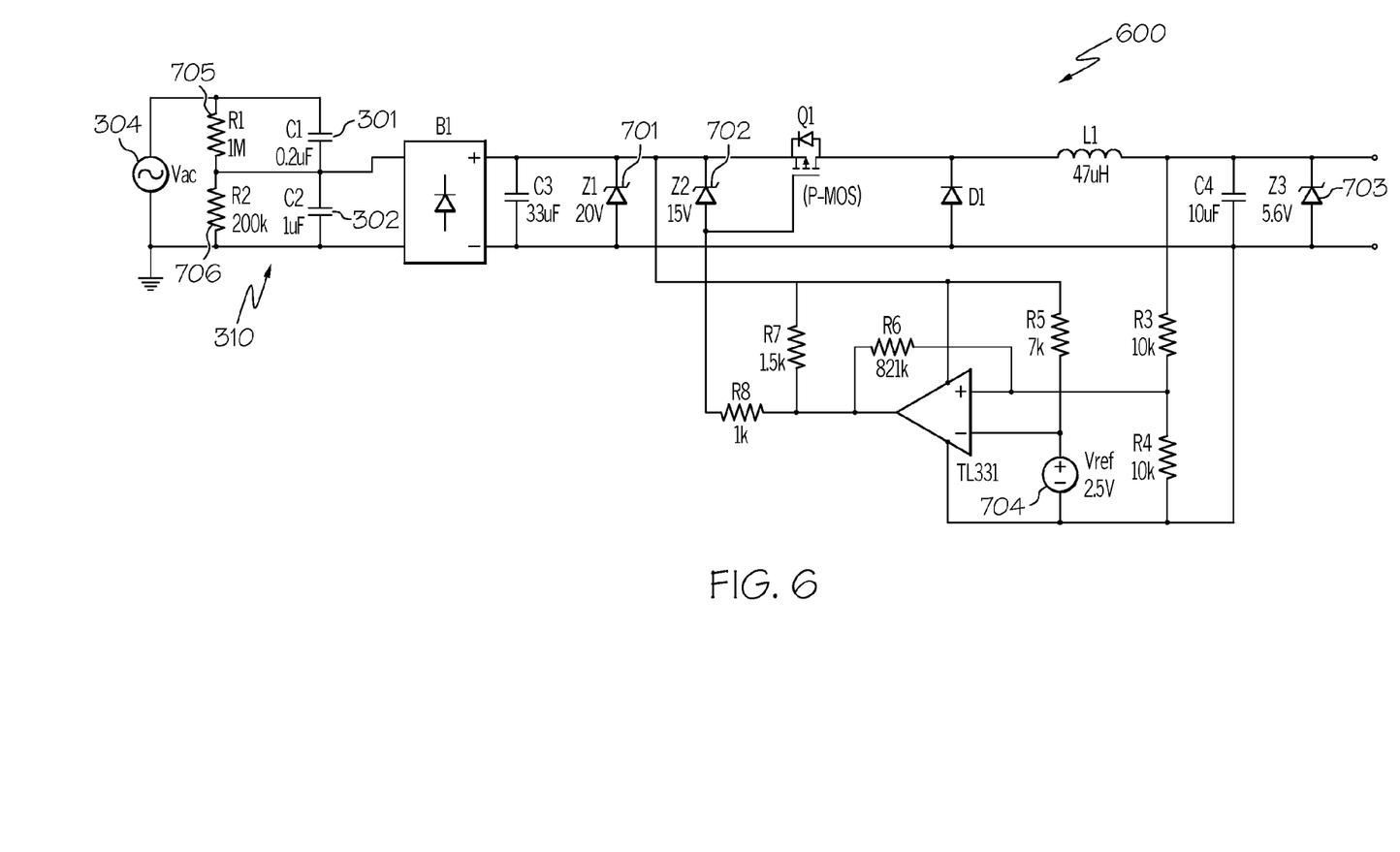
FIG. 6 is a detail circuit schematic drawing of the capacitor divider based offline AC/DC converter of FIG. 5, according to an embodiment of the invention.

The circuit 600 shown in FIG. 6 may illustrate the detailed circuit implementation of the concept of circuit 500 (FIG. 5). By way of example and not of limitation, the input voltage for this example may be in a range of from 96V to 180V rms, and the input frequency may be in a range of from 360 Hz to 800 Hz. The output voltage requirement may be 5V. The load may be in a range of from 10 mA to 20 mA. Zener diodes 701, 702, and 703 may all be optional protective components. The 2.5V voltage reference Vref 704 may be implemented by any standard voltage reference IC, such as for example a TL1431. Capacitor 301 may be the only high voltage capacitor in circuit 600. The capacitor 301 may be provided by two 0.1 uF/250V ceramic capacitors with 1206 package in parallel. Resistors 705 and 706 may be optional high value resistors used to balance the voltage. A circuit 600 such as the one described may be confined to within the area of 1 square inch.

Figure 7:
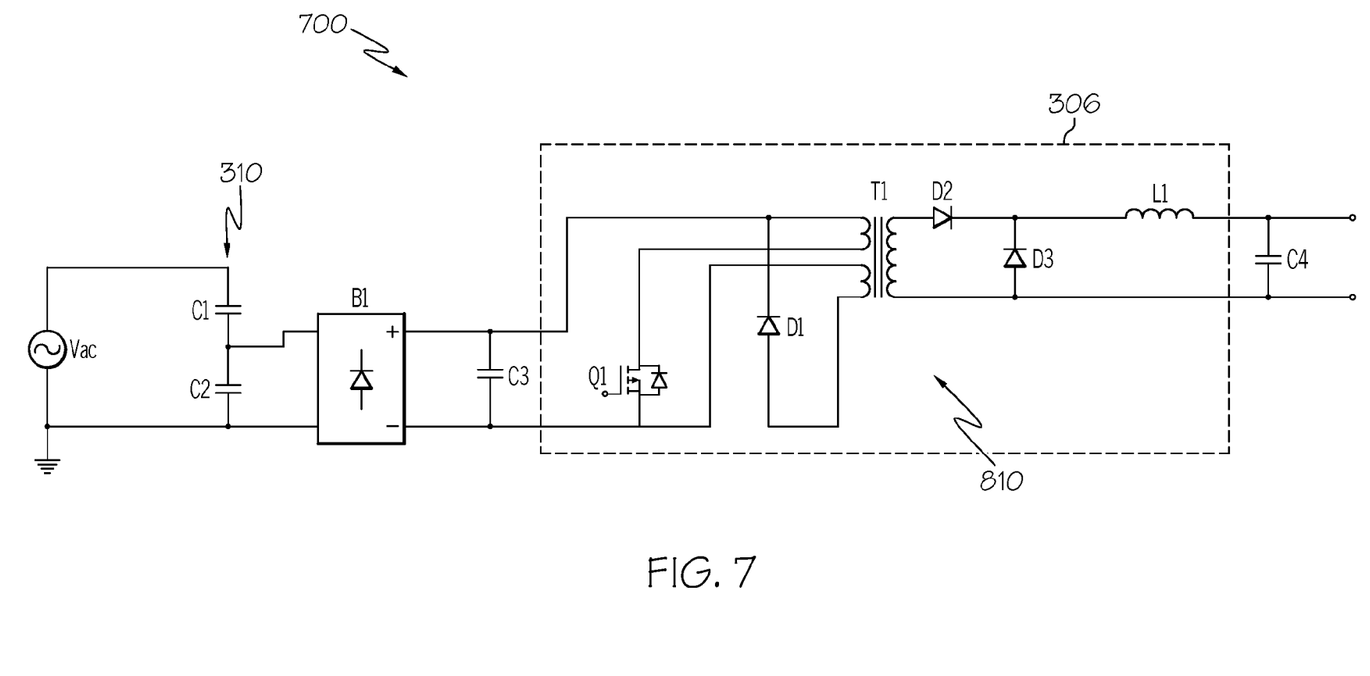
FIG. 7 is a schematic drawing of the power circuit portion of a capacitor divider based offline AC/DC converter having as the second stage a forward converter, according to an embodiment of the invention.
Figure 8:
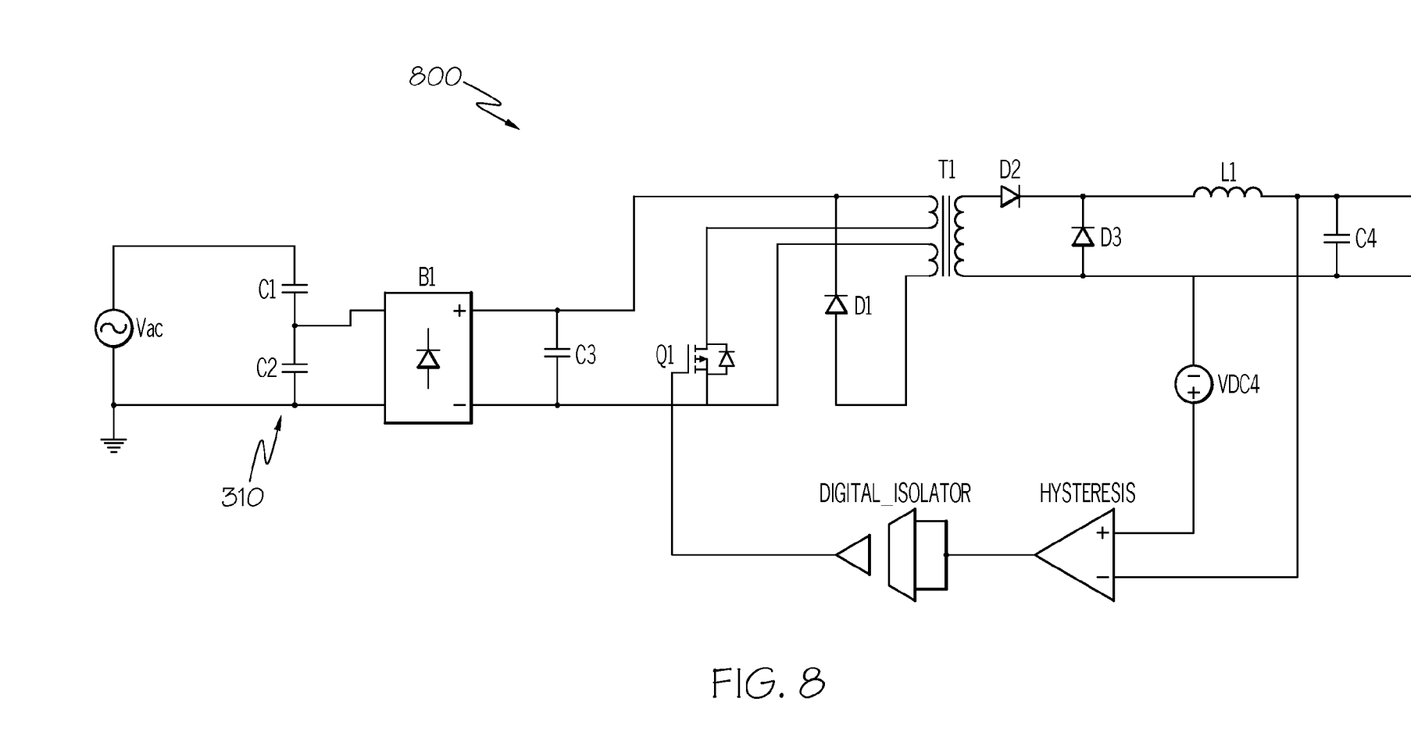
FIG. 8 is a schematic drawing of the capacitor divider based offline AC/DC converter shown in FIG. 7 with a conceptual hysteresis control and a digital isolator, according to an embodiment of the invention.

Referring now to FIG. 7, circuit 700 may illustrate yet another embodiment of the invention. If isolation is required, the configuration of the buck converter used as the second stage 306 may be modified to form an isolated buck converter 810, which is also known as forward converter. As with the non-isolated circuits 400, 500, or 600, the hysteresis control can be applied. Because of using hysteresis control, linear feedback with the opto-couple may not be required. Instead, a digital isolator can be used to pass the on-off signal only. The conceptual schematic circuit 800 may be depicted in FIG. 8.

Figure 9:
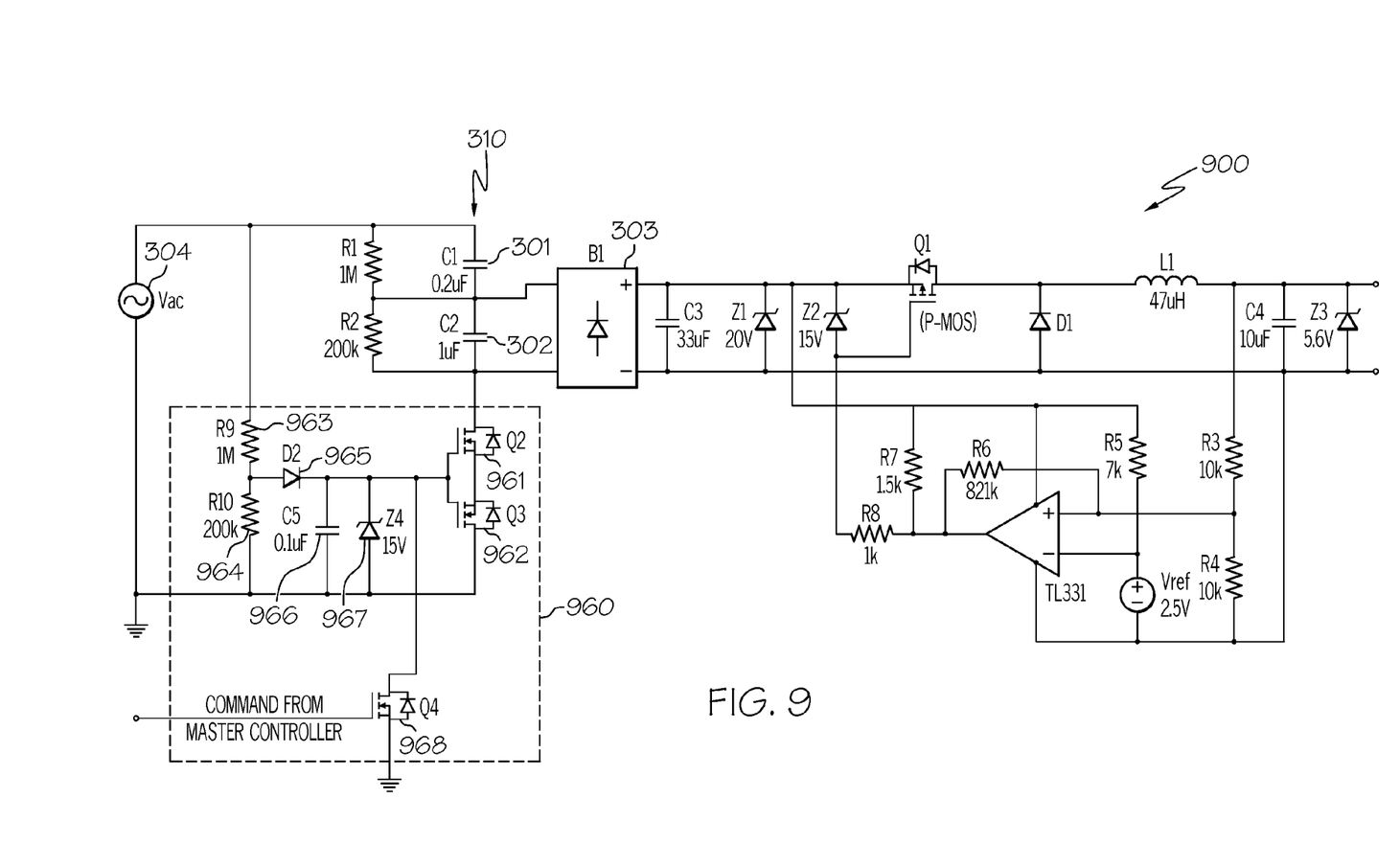
FIG. 9 is a detail circuit schematic drawing of the capacitor divider based offline AC/DC converter shown in FIG. 8 with a reactive current cut-off circuit for input control and increasing the power factor, according to an embodiment of the invention.

The input stage of the circuit provided by the invention may be a capacitor divider, so the overall impedance presented by the inventive circuit may be capacitive in nature. In many cases, the capacitive impedance may provide reactive compensation to the system. However, this is not always preferred. It may be desirable to additionally cut the reactive current within the circuit. The circuit 900 shown in FIG. 9 shows the circuit 800 given in FIG. 8 with an optional circuit 960 that may cut the reactive current. An AC switch may be provided by a pair of back-to-back N channel MOSFET's 961 and 962. This AC switch may be connected between the input power return and the common pin, or ground connection, of the rectifier 303 and the capacitor 302. When the AC switch is turned off, the power supply is powered off. By default, the AC switch may be on whenever AC power is available. This may be achieved by the reactive current cut-off circuit composed of resistors 963 and 964, diode 965, capacitor 966, and zener diode 967. A control MOSFET 968 may be connected to the gate of the AC switch. MOSFET 968 may be controlled by a master control circuit (not shown), which may monitor the load of the AC voltage source 304. If the AC voltage source 304 is in no load condition, then the master controller may have the option of turning the AC switch off, so that no current is drawn from the AC voltage source 304.

Figure 10:
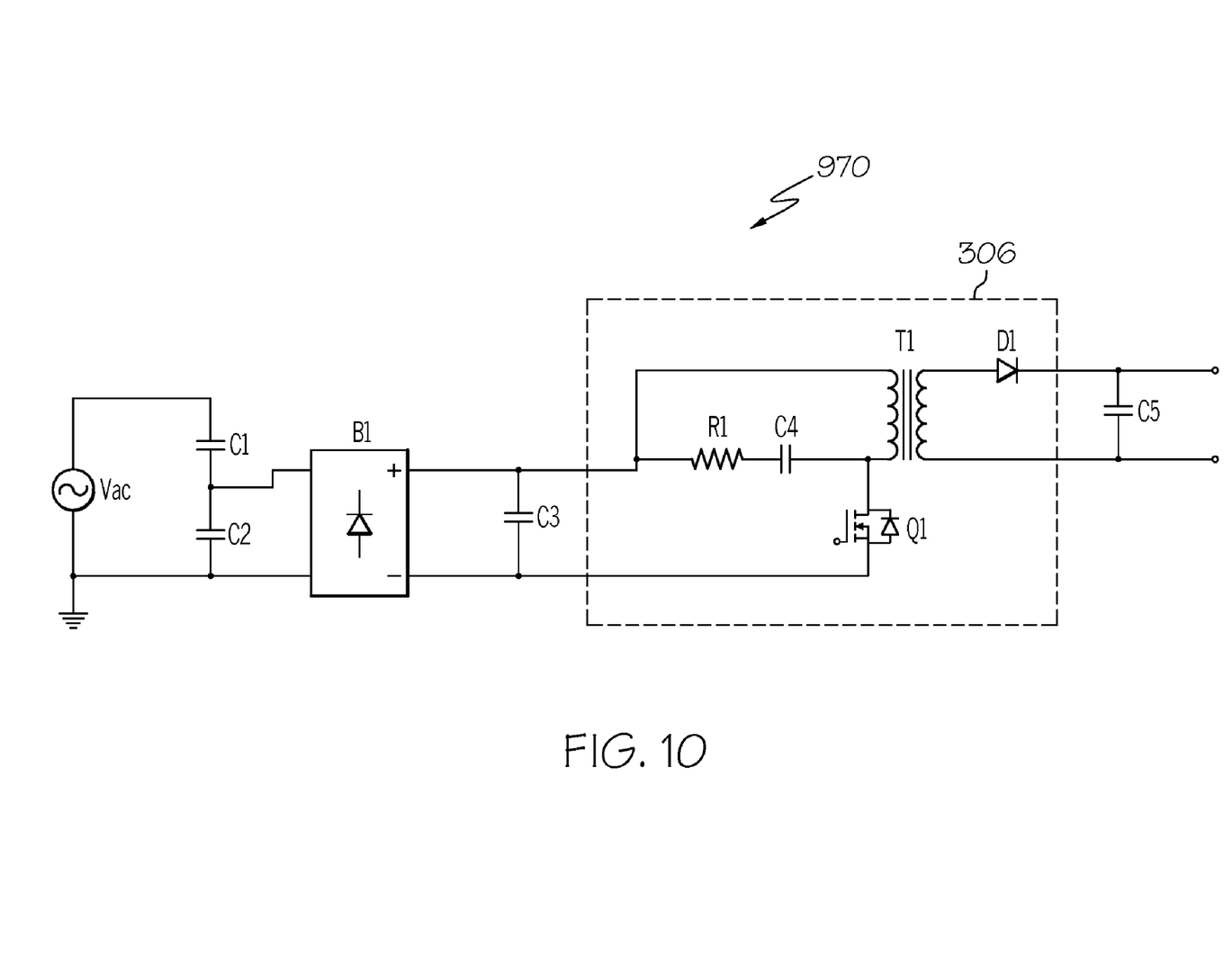
FIG. 10 is a schematic drawing of the is a schematic drawing of the power circuit of a capacitor divider based offline AC/DC converter having as the second stage a flyback converter, according to an embodiment of the invention.

Referring now to FIG. 10, a circuit 970 may be shown, which is illustrates yet another embodiment of the invention, where the second stage 306 is a flyback converter. Such an embodiment may be used when it is desirable to isolate the load from the voltage source. Control of the circuit may be applied by using a hysteresis control circuit in the same manner as is illustrated by the conceptual circuit 500 (FIG. 5).

Thus, it may be seen that a novel capacitor divider based offline AC/DC converter has been provided and described herein. It should be understood, of course, that the foregoing relates to exemplary embodiments of the invention and that modifications may be made without departing from the spirit and scope of the invention as set forth in the following claims.

We claim:

1. An AC/DC power converter coupled to an AC voltage source having a ground terminal and a power terminal, the AC/DC power converter comprising:
   a first stage comprising a capacitor divider, the capacitor divider further comprised of a plurality of capacitors directly connected in series between the AC voltage source ground terminal and the AC voltage source power terminal, a selected capacitor from the plurality of capacitors with a capacitor power terminal and a capacitor ground terminal, wherein the capacitor terminals provide a voltage across the selected capacitor;
   a rectifier receiving the voltage across the capacitor power terminal and the capacitor ground terminal and providing an unregulated DC voltage across a rectifier output terminal and a rectifier ground terminal; and
   a second stage comprising a switch mode power converter having an output power terminal and an output ground terminal, the second stage receiving the unregulated DC voltage from the rectifier and providing a regulated DC voltage across the output power terminal and the output ground terminal
   wherein the AC voltage source provides an input voltage in a range of from about 90 V to about 180 V rms and an input frequency in a range of from about 360 Hz to about 800 Hz.

2. The AC/DC power converter of claim 1, further comprising a smoothing capacitor connected across the rectifier output terminal and the rectifier ground terminal.

3. The AC/DC power converter of claim 1, further comprising a hysteresis control circuit.

4. The AC/DC power converter of claim 1, wherein the switch mode power converter is a buck converter comprising:
   a transistor having a first transistor terminal connected to the rectifier output terminal and a second transistor terminal;
   a diode having an anode connected to the second transistor terminal and a cathode connected to ground; and a coil having a first coil terminal connected to the second transistor terminal and the anode, the coil having a second coil terminal providing a regulated DC voltage to the output terminal.

5. The AC/DC power converter of claim 4, wherein the transistor is a P channel metal oxide silicon field effect transistor with a source and a drain, the first transistor terminal is the source, and the second transistor terminal is the drain.

6. The AC/DC power converter of claim 5, further comprising a hysteresis control connected to the gate of the P channel metal oxide silicon field effect transistor, wherein the hysteresis control regulates the voltage across the output terminals.

7. The AC/DC power converter of claim 1, wherein the switch mode power converter is a forward converter.

8. The AC/DC power converter of claim 1, wherein the switch mode power converter is a flyback converter.

9. An AC/DC power system for an avionics system of an aircraft, the system comprising:
- an AC voltage source having a voltage that varies within a first range of from about 90 V to about 180 V and a frequency varies within a second range of from about 360 Hz to about 800 Hz, the AC voltage source further having an AC voltage source power terminal and an AC voltage source ground terminal;
- a capacitor divider comprised of a plurality of capacitors directly connected in series between the AC voltage source ground terminal and the AC voltage source power terminal, a selected capacitor from the plurality of capacitors with a capacitor power terminal and a capacitor ground terminal, wherein the capacitor terminals provide a voltage across the selected capacitor;
- a rectifier receiving the voltage across the capacitor power terminal and the capacitor ground terminal and providing a unregulated DC voltage across a rectifier output terminal and a rectifier ground terminal; and
- a switch mode power supply having an output power terminal and an output ground terminal, the switch mode power supply receiving the unregulated DC voltage from the rectifier and providing a regulated DC voltage across the output power terminal and the output ground terminal.

10. The AC power system described in claim 9, wherein the switch mode power supply is selected from a group consisting of a flyback converter, a buck converter, and a forward converter.

11. The AC/DC power system described in claim 9, further comprising a reactive current cut-off circuit providing input control and increasing the power factor.

12. An AC/DC power converter coupled to an AC voltage source in an avionics system of an aircraft, the AC/DC power converter having a ground terminal and a power terminal, the AC/DC power converter having a rectifier that receives an unregulated AC voltage that varies within a first range of from about 90 V to about 180 V and a frequency varies within a second range of from about 360 Hz to about 800 Hz, the rectifier providing an unregulated DC voltage to a switch mode power supply having an output power terminal and an output ground terminal, the switch mode power supply receiving the unregulated DC voltage from the rectifier and providing a regulated DC voltage across an output power terminal and an output ground terminal to a load, the AC/DC power converter comprising:
- a capacitor divider having two capacitors, the capacitor divider connected in series directly across the ground terminal and a power terminal of the AC voltage source, a selected capacitor of the capacitor divider providing a voltage to the rectifier that is less than the voltage provided by the AC voltage source,
- wherein the A/C-D/C power converter is adapted to occupy a maximum area of 1 square inch.

13. The AC/DC power converter described in claim 12, wherein the switch mode power supply is a buck converter.

14. The AC/DC power converter described in claim 13, wherein the switch mode power supply further comprises a hysteresis control.

15. The AC/DC power converter described in claim 12, wherein the switch mode power supply is a forward converter.

16. The AC/DC power converter described in claim 12, wherein the switch mode power supply is a flyback converter.

17. The AC/DC power converter described in claim 12, wherein the AC/DC power converter further comprises a reactive circuit providing input control and increasing the power factor.

* * * * *